US008783967B2

(12) United States Patent
Montboeuf et al.

(10) Patent No.: US 8,783,967 B2
(45) Date of Patent: Jul. 22, 2014

(54) SUSPENSION STOP AND A MOTOR VEHICLE FITTED WITH SUCH A STOP

(75) Inventors: Bruno Montboeuf, Cerelles (FR); Florence Crenn, Amboise (FR); Richard Corbett, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 50 days.

(21) Appl. No.: 13/376,210

(22) PCT Filed: Jun. 9, 2010

(86) PCT No.: PCT/EP2010/058104
§ 371 (c)(1),
(2), (4) Date: Feb. 23, 2012

(87) PCT Pub. No.: WO2010/142736
PCT Pub. Date: Dec. 16, 2010

(65) Prior Publication Data
US 2012/0141061 A1    Jun. 7, 2012

(30) Foreign Application Priority Data
Jun. 12, 2009   (FR) .................................. 09 53936

(51) Int. Cl.
*F16C 33/46*    (2006.01)
(52) U.S. Cl.
USPC ...................................................... 384/614
(58) Field of Classification Search
USPC .......... 384/611, 623, 621, 523, 526, 528, 614
See application file for complete search history.

(56) References Cited

U.S. PATENT DOCUMENTS

| 3,399,936 | A | * | 9/1968 | Vannest | 384/528 |
| 5,074,679 | A | * | 12/1991 | McLarty | 384/526 |
| 6,814,496 | B2 | * | 11/2004 | Beghini et al. | 384/617 |
| 2004/0234181 | A1 | * | 11/2004 | Kobayashi et al. | 384/528 |
| 2006/0008192 | A1 | | 1/2006 | Sekimoto et al. | |

FOREIGN PATENT DOCUMENTS

| DE | 20014531 U1 | 11/2000 | |
| DE | 102005039736 A1 | 3/2007 | |
| FR | 2831232 A1 | 4/2003 | |
| GB | 2347905 A * | 9/2000 | B60G 15/06 |
| WO | WO 8704502 A1 * | 7/1987 | F16C 33/38 |
| WO | WO 2007022893 A1 * | 3/2007 | B60G 15/06 |

OTHER PUBLICATIONS

Machine translation of WO 2007022893.*

* cited by examiner

*Primary Examiner* — Richard W Ridley
*Assistant Examiner* — Yamilka Pinero Medina
(74) *Attorney, Agent, or Firm* — Bryan Peckjian; SKF USA Inc. Patent Department

(57) ABSTRACT

This motor vehicle suspension stop comprises a first ring, a second ring, balls (26) bearing against two raceways (226, 246) respectively defined by the first ring and by the second ring, and a cage (30) for holding the balls between the raceways. The cage (30) is provided with abutment pins (50), each for bearing against one of the raceways (226, 246), thereby avoiding direct contact between the cage (30) and the adjacent edges (225, 227, 245, 247) of the rings. These pins (50) are distributed on either side of a radial midplane ($P_{30}$) of the cage (30) that contains the centers of cells in the cage. The axial distance ($d_{50}$) between the ends (52) of the abutment pins (50) is strictly less than the minimum distance ($D_{28}$) between the raceways (226, 246).

20 Claims, 5 Drawing Sheets

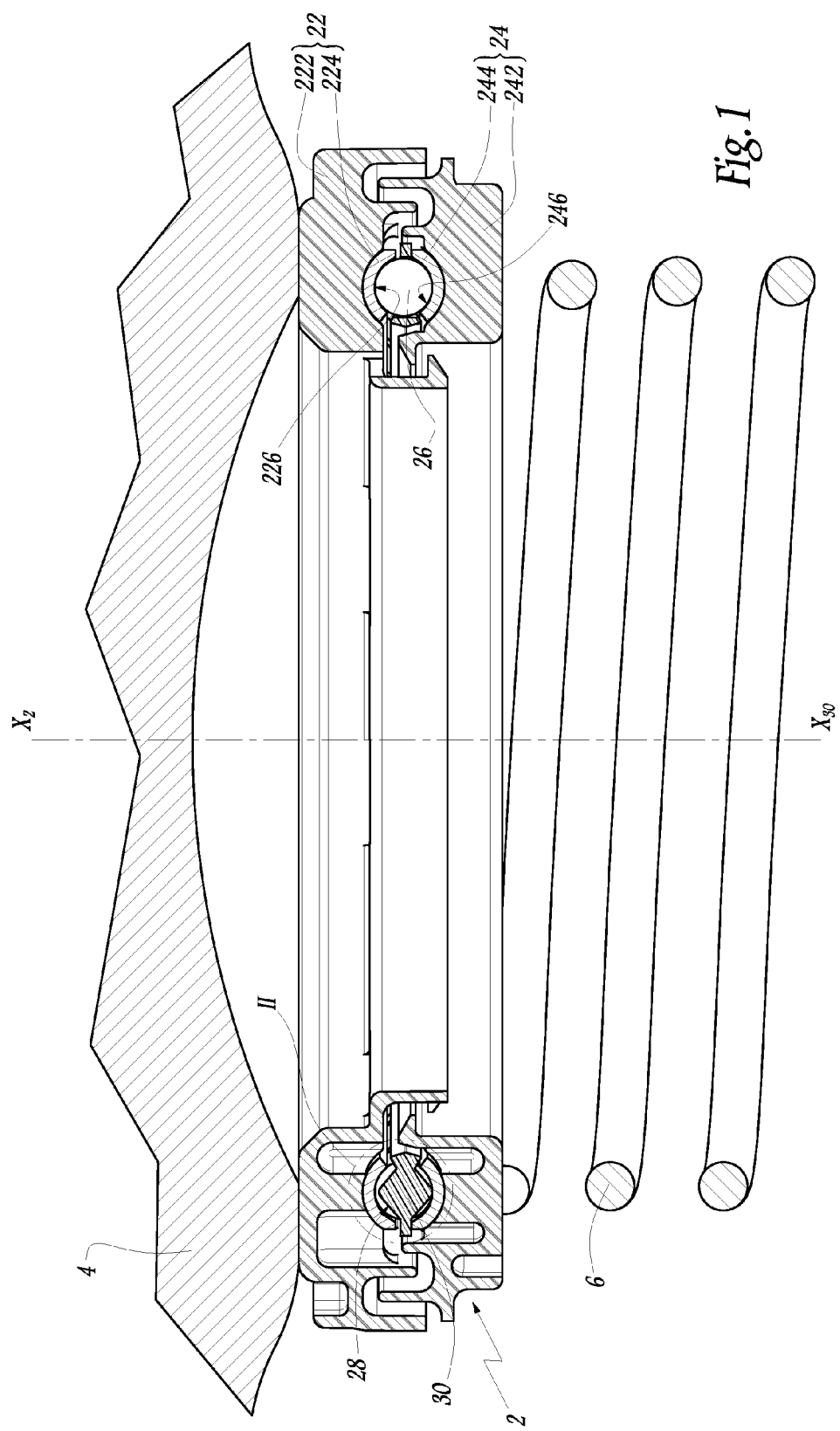

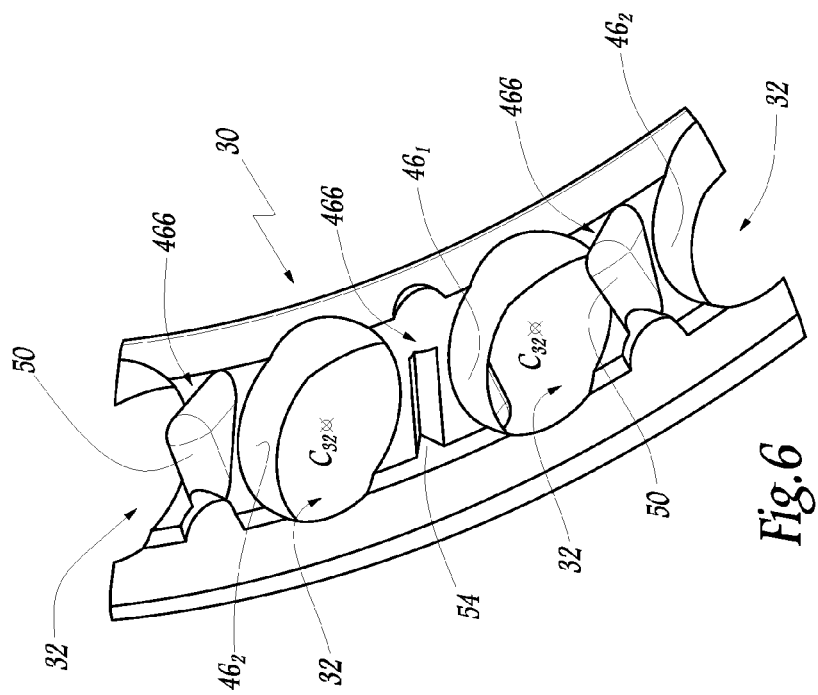
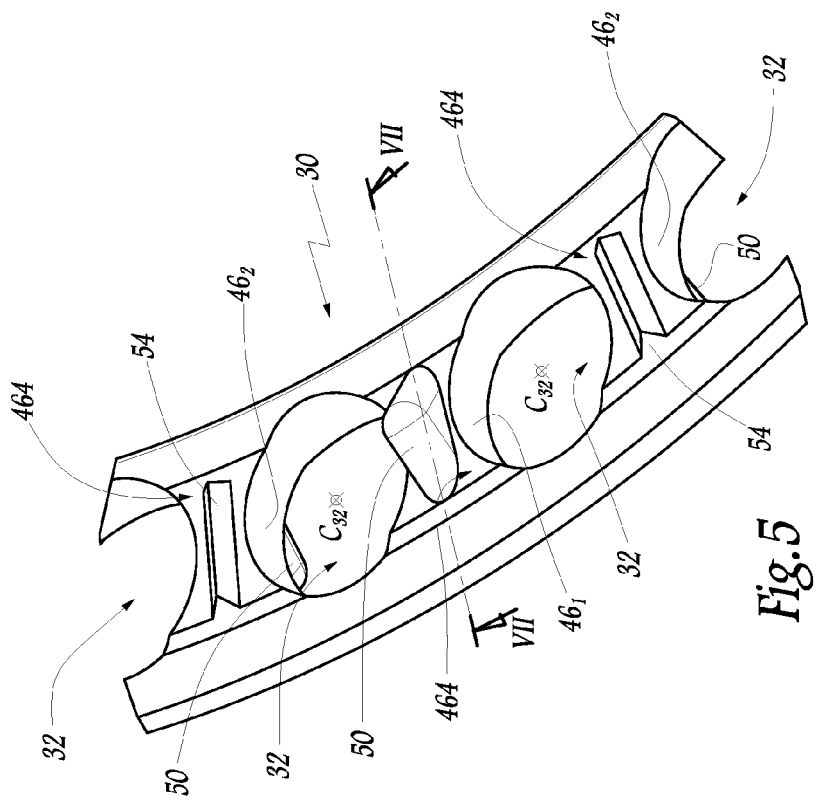

SUSPENSION STOP AND A MOTOR VEHICLE FITTED WITH SUCH A STOP

CROSS-REFERENCE

This application is the US national stage of International Application No. PCT/EP2010/058104 filed on Jun. 9, 2010, which claims priority to French Application No. FR 0953936 filed Jun. 12, 2009.

FIELD OF THE INVENTION

The invention relates to a motor vehicle suspension stop, such a stop being installed above a shock absorber and enabling a set of steerable wheels to swivel, in particular the front wheels of a vehicle of the sedan car type. The invention also provides a motor vehicle fitted with such a suspension stop.

BACKGROUND OF THE INVENTION

A motor vehicle suspension stop is generally made up of two rings having balls disposed between them to run on raceways defined by the two rings. A cage is placed in the ball chamber and serves to keep the balls in position therein.

Document US-A-2006/0008192 provides for portions in relief on the inner and outer radial faces of a cage formed by strip portions, the portions in relief serving to guide balls that are received in the cells of a strip portion forming the cage, thereby making it possible to take advantage of the small radial thickness of the cage. Given its shape, such a cage is not adapted for use within a suspension stop.

Document DE-A-100 2005 039736 also discloses making a cage provided with projecting portions that come to bear simultaneously against the raceways. That cage tends to be subject to wear, because it makes simultaneous contact with both raceways and interferes with the balls bearing against the raceways.

Known suspension stops are subjected to reversals in the direction of pivoting and to friction that exists within said stops, tending to move the cage vertically within the ball chamber, to such an extent that it can strike against an edge of one of the upper or lower rings of the stop via an outer radial portion of the cage referred to herein as its lip. This impedes pivoting of the rings relative to each other and may lead to the lip being ruptured. The cage is then ineffective and, under the worst circumstances, there is a risk of one or more of the balls becoming jammed in the ball chamber. The suspension stop is then blocked. The radial deformation of the ring as subjected to repeated large amplitude oscillations at low speed may also lead to rupture thereof by fatigue.

The invention seeks more particularly to remedy those drawbacks by proposing a novel suspension stop of operation that is made more reliable, and that remains simple to fabricate and to use.

To this end, the invention provides a motor vehicle suspension stop comprising a first ring, a second ring, balls bearing against two raceways respectively defined by the first ring and by the second ring, and a cage for holding the balls between the raceways, the stop being characterized in that the cage is provided with abutment pins for bearing against the raceways, the pins being distributed on both sides of a radial midplane of the cage that contains the centers of cells in the cage, and in that wherein the an axial distance between the ends of the abutment pins is strictly less than a height of a radial section of a ball chamber formed the minimum distance between the raceways.

By means of the invention, the abutment means provided on the cage make it possible, as a function of the direction of rotation of the rings of the suspension stop relative to each other and taking account of the friction between the balls and the age, to limit axial movement of the cage, i.e. movement thereof parallel to the central axis of the stop. This avoids a so-called "flip-flop" or rocking phenomenon in which the cage deforms to come to bear in alternation against the edges of the first and second rings, with high levels of friction and a risk of rupture. The abutment means serve to come into contact with the raceways so that the other portions of the cage, that are not designed for this purpose, do not run the risk of being damaged or ruptured by unwanted contact with the rings of the stop. Since the axial distance between the ends of the pins is less than the minimum distance between the raceways, there is always clearance between the cage and at least one of the raceways, thereby limiting wear of the cage and enabling the balls to bear simultaneously against both raceways, without being hindered as a result of the presence of the cage.

SUMMARY OF THE INVENTION

According to aspects of the invention that are advantageous but not essential, a suspension stop in accordance with the invention may incorporate one or more of the following characteristics, taken in any technically feasible combination:

The abutment pins are arranged on branches of the cage that lie between any two adjacent cells thereof.

Each branch of the cage carries two abutment pins distributed on either side of the above-mentioned radial midplane. In a variant, each branch of the cage carries a single abutment pin extending from one side of the radial midplane, the pins carried by two branches disposed on either side of a cell extend from opposite sides of said plane.

The pins may be cylindrical with rounded ends and centered on an axis that is perpendicular to the midplane. In a variant, the pins are of triangular shape with a rounded projecting corner.

The clearance between at least one of the ends of the abutment pins and at least one of the raceways has a value lying in the range 0.05 millimeters (mm) to 0.2 mm.

The cage is provided with an inner radial bead and with an outer radial lip that are engaged respectively between the inner radial edges and the outer radial edges of two bands defining the raceways, and axial clearance remains on either side of the bead and of the lip relative to the above-mentioned inner and outer radial edges.

The abutment pins are formed integrally with the portion of the cage that defines the cells for receiving the balls. Advantageously, the cage, including its abutment means, is obtained by molding a synthetic material.

The invention also provides a motor vehicle fitted with a suspension stop as mentioned above.

BRIEF DESCRIPTION OF THE DRAWINGS

The invention can be better understood and other advantages thereof appear more clearly in the light of the following description of two embodiments of a suspension stop in accordance with the principle of the invention, given purely by way of example and made with reference to the accompanying drawings, in which:

FIG. 1 is a fragmentary diagrammatic representation of a suspension stop in accordance with the invention mounted on a motor vehicle in accordance with the invention;

FIG. 5 is a perspective view analogous to FIG. 3 for a cage in accordance with a second embodiment of the invention;

FIG. 6 is a perspective view of the portion of cage shown in FIG. 5, seen from a different angle;

DETAILED DESCRIPTION OF THE PREFERRED EMBODIMENTS

Figure 3:
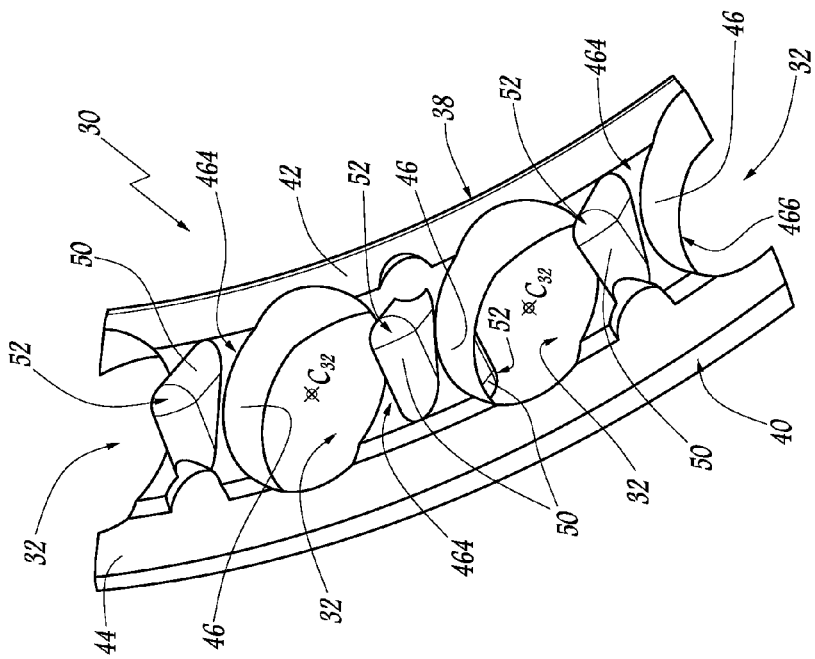
FIG. 3 is a fragmentary perspective view of a cage used in the stop of FIGS. 1 and 2.

The suspension stop 2 shown in part in FIGS. 1 to 4 is mounted on the chassis 4 of a motor vehicle that is not shown in greater detail in order to clarify the drawing. The stop 2 has a suspension spring 6 bearing thereagainst.

In the utilization configuration, the stop 2 has the top portion of a suspension strut passing therethrough.

The suspension stop 2 comprises a top ring 22 that is stationary relative to the chassis 4 and that is constituted by an annular body 222 or "cup" made of synthetic material, and a steel band 224 that is likewise annular and that is shaped to constitute a raceway 226 forming a segment of a torus. The steel band 224 is freely mounted in the cup 222. In another embodiment of the invention, the parts 222 and 224 are secured to each other by snap-fastening or by overmolding.

The stop 2 also has a bottom ring 24 that is rotatable about a central axis $X_2$ of the stop 2, said axis constituting an axis of symmetry for the rings 22 and 24.

The bottom ring 24 is made of an annular body or "cup" of synthetic material 242 and a steel band 244 identical to the band 224 and defining a raceway 246. The parts 242 and 244 are assembled together like the parts 222 and 224.

The ring 24 may be driven in rotation about the axis $X_2$ by means that are not shown, as a function of the angle imparted to the steerable wheels of the vehicle.

The rings 22 and 24 are not necessarily made up of two parts, and each of them could be constituted by a one-piece element that also defines a raceway.

Balls 26 are installed in a ball chamber 28 defined between the rings 22 and 24. A cage 30 of synthetic material, e.g. of thermoplastic polymer, such as fiberglass-filled polypropylene, polyamide 66 (PA66), polyphenylene sulfide (PPS), or any optionally filled synthetic material, is also installed in the ball chamber 28 and maintains the angular spacing of the balls 26 around the axis $X_2$. The cage 30 comprises a single piece and it is centered on an axis $X_{30}$ that normally coincides with the axis $X_2$ in the assembled configuration of the stop 2. The cage 30 defines thirty-six cells 32, each dimensioned to receive one ball 26, and they are regularly distributed around the axis $X_{30}$.

In the present invention, terms such as "axial", "radial", "axially", and "radially" are used relative to the axis of rotation $X_2$ of the ring 24 relative to the ring 22, and also relative to the central axis $X_{30}$ of the cage 30. A direction is "axial" when it is parallel to such an axis, and it is "radial" when it is perpendicular to and intersects said axis. A plane is "radial" when it is perpendicular to such an axis.

The radial midplane of the cage 30 is written $P_{30}$, said plane being perpendicular to the axis $X_{30}$. The plane $P_{30}$ contains the center $C_{32}$ of each cell. The cage 30 has two sides 34 and 36 facing respectively towards the ring 22 and towards the ring 24 in the configuration of FIGS. 1 and 2. The cells extend between an inner radial edge 38 and an outer radial edge 40 of the cage 30.

The inner radial edge 38 of the cage 30 is defined by a bead 42 that presents axial thickness that is greater than the portion of the cage 30 in which the cells 32 are defined. The outer radial edge 40 is defined by a lip or heal 44 that presents axial thickness that is less than the thickness of the portion of the cage 30 in which the cells 32 are defined.

In an embodiment of the invention that is not shown, the shape of the lip or heal 44 is identical to that of the bead 42, such that the cage presents a section that is symmetrical about a midplane perpendicular to the plane occupied by the balls.

In the assembled configuration of the stop 2, the bead 42 is engaged between the inner radial edges 225 and 245 of the bands 224 and 244, while the lip 44 is engaged between the outer radial edges 227 and 247 of these bands.

Each cell 32 is defined between two branches 46 of the cage 30 that extend between the bead 42 and the lip 44.

In order to avoid untimely contact between the bead 42 and one of the edges 225 or 245, or untimely contact between the lip 44 and one of the edges 227 or 247, the cage 30 is provided with seventy-two pins 50 that extend parallel to the axis $X_{30}$, each from one of the faces of one of the branches 46, i.e. from one of the sides 34 or 36 of the cage 30.

Figure 2:
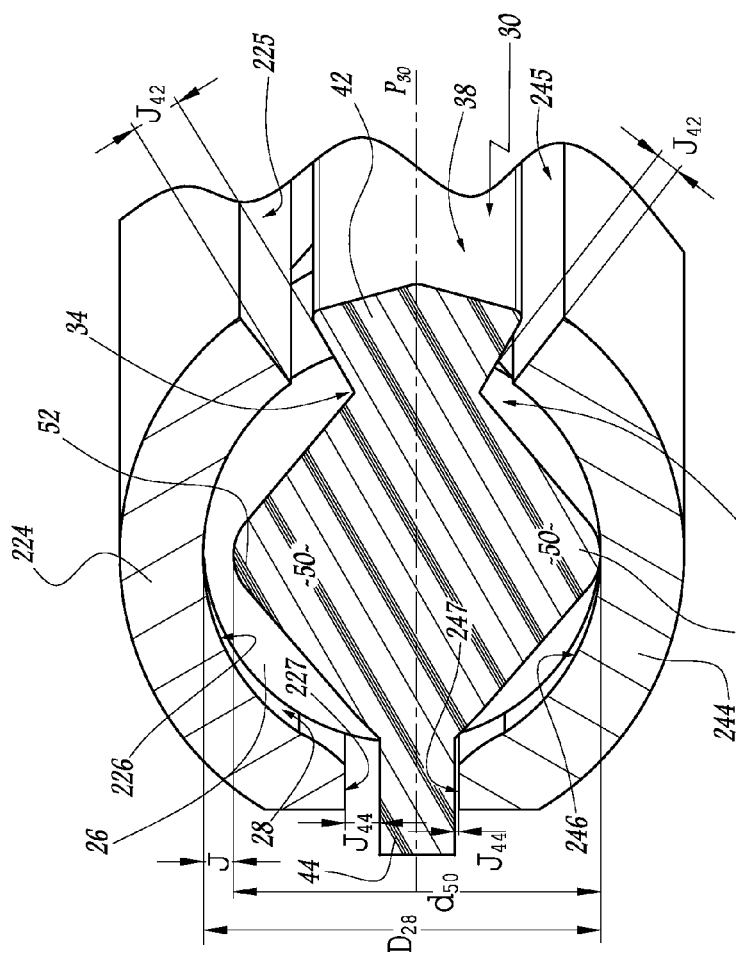
FIG. 2 is a view on a larger scale showing detail II of FIG. 1.
Figure 4:
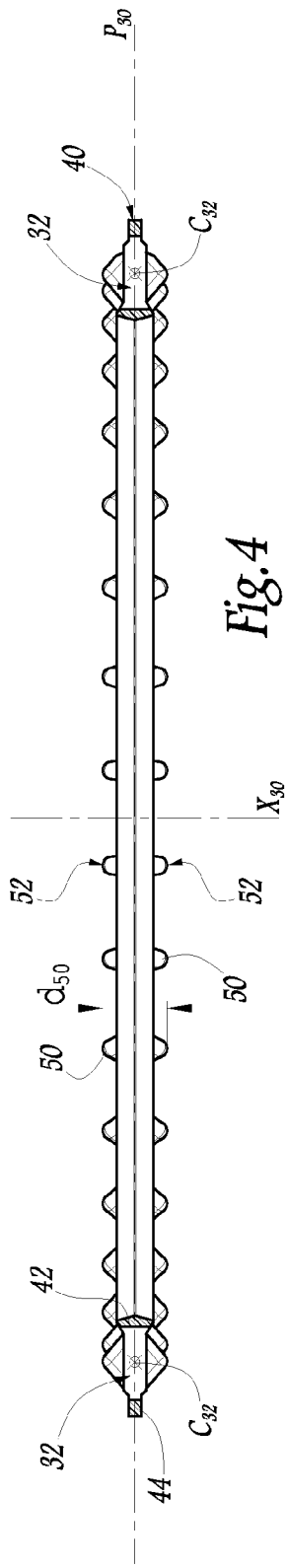
FIG. 4 is a diametral section of the cage shown in part in FIG. 3.

As can be seen more particularly in FIG. 2, each pin 50, in radial section relative to the axis $X_{30}$, presents the shape of a triangle with an end 52 forming a rounded corner. The axial distance measured parallel to the axis $X_{30}$ between the ends 52 of the pins 50 is written $d_{50}$.

The height of a radial section of the ball chamber 28, i.e. the maximum distance between the raceways 226 and 246 in the assembled configuration of the stop 2, is written $D_{28}$, this height being equal to the diameter of the balls 26.

The value of the distance $d_{50}$ is strictly less than the value of the diameter $D_{28}$, so that clearance J is permanently present between at least one of the ends 52 and at least one of the raceways 226 and 246. In practice, the distance $d_{50}$ is selected as a function of the height $D_{28}$ so that the clearance J has a value lying in the range 0.05 mm to 0.2 mm.

Given the presence of the pins 50, in the event of the cage 30 moving axially, whether upwards or downwards in FIG. 2, and in particular as a result of friction and stresses internal to the stop 2, in particular between the balls and the cage, this movement is stopped by the fact that one of the pins 50 comes to bear via its rounded end 52 against one of the raceways 226 or 246, i.e. on a portion of the rings 22 and 24 against which the balls 26 run. The shape of the pins 50 is selected so that, under such circumstances, axial clearance $J_{44}$ remains on either side of the lip 44 relative to the edges 227 and 247. The shape of the pins 50 is also selected in such a manner that axial clearance $J_{42}$ remains on either side of the bead 42 relative to the edges 225 and 245. In FIG. 2, it can be seen that the clearances $J_{42}$ and $J_{44}$ are not regularly distributed on either side of the plane $P_{30}$, which should be associated with the fact that the pin 50 facing towards the band 244 is bearing against the raceway 246, whereas the pin 50 facing towards the band 224 is at a distance from the raceway 226, equal to the value of the clearance J.

The presence of pins 50 thus avoids direct contact between the bead 42 or the lip 44 and the closest portion of the rings 22 and 24, i.e. the edges 225, 227, 245, or 247. This increases the lifetime of the cage 30 and reduces energy losses due to friction.

The pins 50 are distributed on the cage 30, being arranged on both sides 464 and 466 of each branch 46 corresponding to the two sides 34 and 36 of the cage 30. These pins enable the cage 30 to be positioned effectively in the ball chamber 28.

Figure 7:
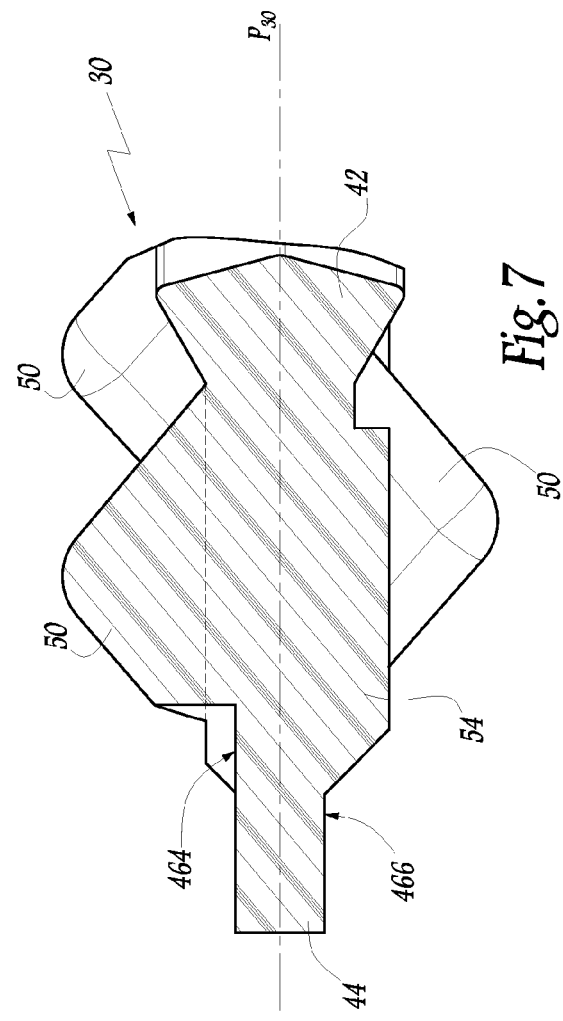
FIG. 7 is a section on a larger scale on line VII-VII of FIG. 5.

In the second embodiment of the invention as shown in FIGS. 5 to 7, elements analogous to those of the first embodiment are given the same references. Below, the description relates mainly to the differences compared with the above-described embodiment. Unless mentioned to the contrary, elements in the second embodiment are identical to and operate in the same way as elements of the first embodiment.

This second embodiment differs from the above-described embodiment in that the triangular shaped pins 50 are distributed on either side of the radial midplane $P_{30}$ of the cage 30 on one side of the plane from a branch 46 adjacent to a cell 32, and on the other side of the plane from the other branch 46 adjacent to the cell. In other words a pin 50 extends from the side 464 of a first branch $46_1$ and another pin extends from the side 466 of another branch $46_2$ situated on the other side of the cell 32 adjacent to the branch $46_1$.

On the side 464 or 466 of a branch 46 that does not have a pin 50, the cage 30 is provided with a rib 54 of triangular section that has the function of guiding the balls 28 while they are being put into place in the cells 32 and of retaining a quantity of grease on the cage 30 in the proximity of each cell.

Figure 8:
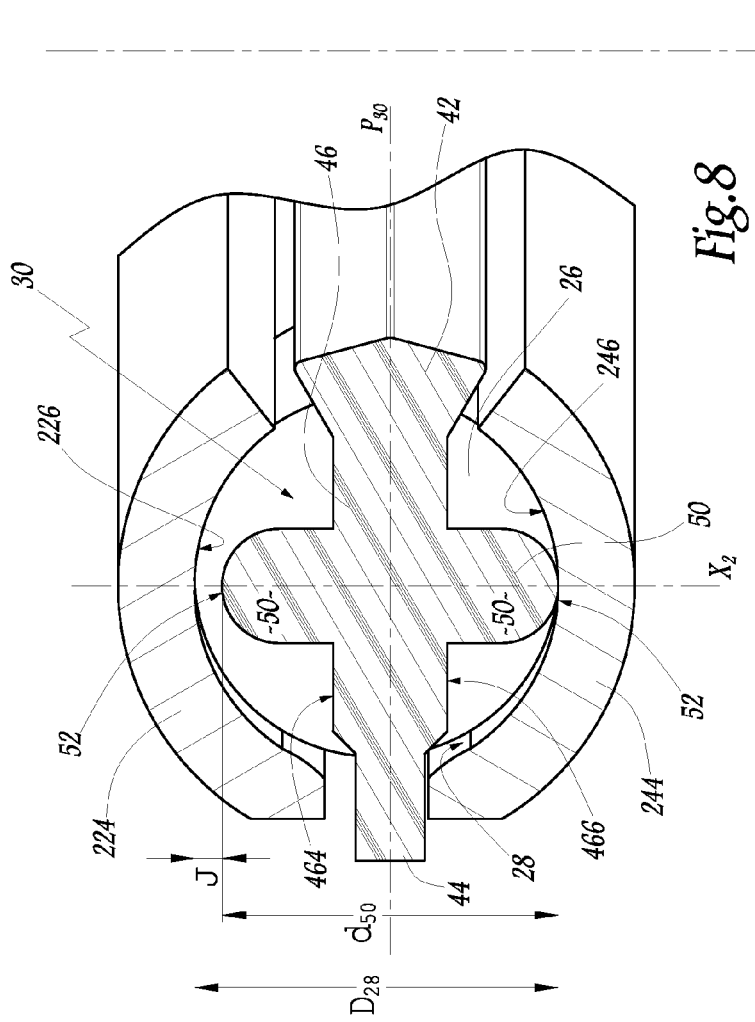
FIG. 8 is a view analogous to FIG. 2, for a stop in accordance with a third embodiment of the invention.
Figure 9:
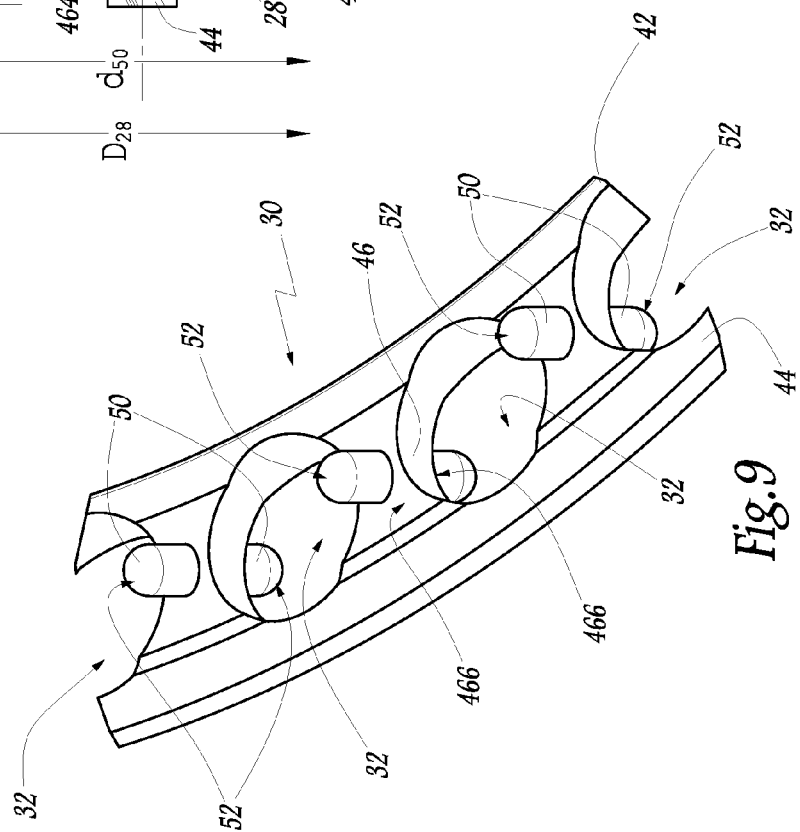
FIG. 9 is a fragmentary perspective view, analogous to FIG. 3, showing a cage used in the stop shown in part in FIG. 8.

In the third embodiment of the invention shown in FIGS. 8 and 9, elements that are analogous to elements of the first embodiment are given the same references. As above, the description relates only to points that differ from the above-described embodiments. Unless mentioned to the contrary, elements of this third embodiment are identical to and operate in the same manner as elements of the first embodiment.

In this embodiment, the pins 50 for centering the cage 30 in the ball chamber 28 are circular-section cylinders, each extending along an axis $X_{50}$ parallel to the central axis $X_{30}$ of the cage 30 and perpendicularly to its radial midplane $P_{30}$. Each pin 50 has a rounded end 52 that may come to bear against a raceway 226 or 246 as defined by a steel band 224 or 244 forming part of one of the rings of the suspension stop all identical to the rings 22 and 24 of the first embodiment. The pins 50 project from both sides 464 and 466 of each branch 46 so as to extend between pairs of adjacent cells 32 in the cage 30.

In a variant of the invention that is not shown, these pins may extend from one side only of each branch 46 in alternation from one side and from the other side of the plane $P_{30}$, in an approach that is comparable to that of the second embodiment.

The axial distance $d_{50}$ between the rounded ends 52 of the pins 50 is selected to be less than the height $D_{28}$ of the ball chamber 28 formed between the raceways 226 and 246, and of the balls 26 that are installed therein, such that the axial clearance J is always present. As in the first embodiment, this axial clearance J prevents the pins 50 from touching both raceways 226 and 246 simultaneously, thereby avoiding slowing down the running of the balls on the raceways in question. The pins 50 avoid direct contact between the edges of the bands 224 and 244 and a bead 42 and a lip or heal 44 constituting the inner and outer radial edges of the cage 30.

In a variant of the invention that is not shown, the cage 30 may be made of metal, in particular of stamped steel.

The technical characteristics of the embodiments described may be combined with one another.

The invention claimed is:

1. A motor vehicle suspension stop comprising:
   a first ring;
   a second ring;
   balls bearing against two raceways respectively defined by the first ring and by the second ring; and
   a cage for holding the balls between the raceways, the stop being provided with abutment pins, each for bearing against one of the raceways, the pins being distributed on both sides of a radial midplane of the cage that contains centers of cells in the cage, and wherein an axial distance between the ends of the abutment pins is strictly less than a height of a radial section of a ball chamber formed between the raceways,
   wherein the abutment pins are arranged on branches of the cage that lie between any two adjacent cells of the cage and configured to contact an adjacent raceway of the two raceways when the cage is subjected to excessive axial movement.

2. The stop according to claim 1, wherein each branch of the cage carries two abutment pins distributed on either side of the radial midplane.

3. The stop according to claim 1, wherein a first branch is disposed on a first side of the cell and a second branch is disposed on a second, opposite side of the cell and each branch of the cage carries a single abutment pin;
   a first single abutment pin extends from a first radial midplane side of the first branch and a second single abutment pin extends from a second radial midplane side of the second branch, wherein the first radial midplane side and the second radial midplane side are located on opposite sides of the radial midplane.

4. The stop according to claim 1, wherein the pins are cylindrical with rounded ends and centered on an axis that is perpendicular to the midplane.

5. The stop according to claim 1, wherein the pins are of triangular shape with a rounded projecting corner.

6. The stop according to claim 1, wherein a clearance between at least one end of the abutment pins and at least one of the raceways has a value lying in the range 0.05 mm to 0.2 mm.

7. The stop according to claim 1, wherein the cage is provided with an inner radial bead and with an outer radial lip that are engaged respectively between inner radial edges and outer radial edges of two bands defining the raceways, and in that axial clearance remains on either side of the bead and of the lip relative to the inner radial edges and outer radial edges.

8. The stop according to claim 1, wherein the abutment pins are formed integrally with a portion of the cage that defines the cells for receiving the balls.

9. A motor vehicle fitted with a suspension stop, the stop comprising:
   a first ring;
   a second ring;
   balls bearing against two raceways respectively defined by the first ring and by the second ring; and
   a cage for holding the balls between the raceways, the stop being provided with abutment pins, each for bearing against one of the raceways, each pin having a rounded distal end, the pins being distributed on both sides of a radial midplane of the cage that contains centers of cells in the cage, and wherein an axial distance between ends of the abutment pins is strictly less than a height of a radial section of a ball chamber formed between the raceways, wherein the abutment pins are arranged on branches of the cage that lie between any two adjacent cells of the cage and configured to contact an adjacent raceway of the two raceways when the cage is subjected to excessive axial movement.

10. The stop according to claim 9, wherein the pins are of triangular shape with a rounded projecting corner.

11. The stop according to claim 9, wherein the abutment pins are formed integrally with a portion of the cage that defines the cells for receiving the balls.

12. The stop according to claim 9, wherein the abutment pins are arranged on branches of the cage that lie between any two adjacent cells of the cage.

13. The stop according to claim 12, wherein each branch of the cage carries a single abutment pin extending from one side of the radial midplane, and in that pins carried by two branches disposed on either side of a cell extend from opposite sides of the radial midplane.

14. A motor vehicle suspension stop comprising:
a first ring;
a second ring;
balls bearing against two raceways respectively defined by the first ring and by the second ring; and
a cage for holding the balls between the raceways, the stop being provided with abutment pins, each for bearing against one of the raceways, the pins being distributed on both sides of a radial midplane of the cage that contains centers of cells in the cage,
wherein an axial distance between the ends of the abutment pins is strictly less than a height of a radial section of a ball chamber formed between the raceways,
wherein the pins are cylindrical with rounded ends and centered on an axis that is perpendicular to the midplane.

15. The stop according to claim 14, wherein the abutment pins are arranged on branches of the cage that lie between any two adjacent cells of the cage.

16. The stop according to claim 15, wherein each branch of the cage carries two abutment pins distributed on either side of the radial midplane.

17. The stop according to claim 15, wherein each branch of the cage carries a single abutment pin extending from one side of the radial midplane, and in that pins carried by two branches disposed on either side of a cell extend from opposite sides of the radial midplane.

18. The stop according to claim 14, wherein a clearance between at least one end of the abutment pins and at least one of the raceways has a value lying in the range 0.05 mm to 0.2 mm.

19. The stop according to claim 14, wherein the cage is provided with an inner radial bead and with an outer radial lip that are engaged respectively between inner radial edges and outer radial edges of two bands defining the raceways, and in that axial clearance remains on either side of the bead and of the lip relative to the inner radial edges and outer radial edges.

20. The stop according to claim 14, wherein the abutment pins are formed integrally with a portion of the cage that defines the cells for receiving the balls.

\* \* \* \* \*